(12) United States Patent
Kull

(10) Patent No.: US 6,911,748 B2
(45) Date of Patent: Jun. 28, 2005

(54) SPINDLE MOTOR

(75) Inventor: Andreas Kull, Donaueschingen (DE)

(73) Assignee: Minebea Co. Ltd., Nagano (JP)

( * ) Notice: Subject to any disclaimer, the term of this patent is extended or adjusted under 35 U.S.C. 154(b) by 0 days.

(21) Appl. No.: 10/459,014

(22) Filed: Jun. 10, 2003

(65) Prior Publication Data
US 2004/0251755 A1 Dec. 16, 2004

(51) Int. Cl.⁷ .......................... H02K 11/00; F16C 32/06
(52) U.S. Cl. ..................................... 310/67 R; 384/100
(58) Field of Search ............................................ 310/90

(56) References Cited

U.S. PATENT DOCUMENTS

| | | |
|---|---|---|
| 5,980,113 A | 11/1999 | Grantz |
| 6,019,516 A | 2/2000 | Leuthold et al. |
| 6,118,620 A | 9/2000 | Grantz et al. |
| 6,130,802 A | 10/2000 | Rahman et al. |
| 6,144,523 A | 11/2000 | Murthy et al. |
| 6,148,501 A | 11/2000 | Grantz et al. |
| 6,149,161 A | 11/2000 | Grantz et al. |
| 6,154,339 A | 11/2000 | Grantz et al. |
| 6,181,039 B1 | 1/2001 | Kennedy et al. |
| 6,280,088 B1 | 8/2001 | Leuthold et al. |
| 6,292,328 B1 | 9/2001 | Rahman et al. |
| 6,322,252 B1 | 11/2001 | Grantz et al. |
| 6,404,087 B1 * | 6/2002 | Ichiyama ..................... 310/90 |
| 6,545,378 B2 * | 4/2003 | Chen et al. ............... 310/67 R |
| 6,575,634 B2 | 6/2003 | Nottingham |
| 6,583,952 B1 | 6/2003 | Grantz et al. |
| 6,657,339 B2 * | 12/2003 | Herndon et al. .............. 310/90 |
| 6,717,308 B2 * | 4/2004 | Chen et al. .................... 310/90 |
| 6,731,456 B2 * | 5/2004 | Parsoneault et al. ...... 360/99.08 |
| 6,762,529 B2 * | 7/2004 | Herndon et al. ............ 310/216 |
| 6,841,907 B2 * | 1/2005 | Kull ............................. 310/90 |

* cited by examiner

Primary Examiner—Darren Schuberg
Assistant Examiner—Heba Elkassabgi
(74) Attorney, Agent, or Firm—Joel Lutzker; Anna Vishev; Schulte Roth & ZabelLLP

(57) ABSTRACT

The present invention provides a spindle motor and a method of manufacturing a spindle motor wherein a bearing unit is manufactured as a discrete modular component. A spindle motor that meets a set of specific technical requirements can be easily manufactured by combining such a bearing unit with other spindle moor components.

8 Claims, 3 Drawing Sheets

SPINDLE MOTOR

FIELD OF INVENTION

The following application relates to the field of spindle motors and more specifically to a design that allows for more efficient manufacture of such motors.

BACKGROUND OF THE INVENTION

Disc drive systems have been used in computers and other electronic devices for many years for storage of digital information. Information is recorded on concentric memory tracks of a magnetic disc medium, the actual information being stored in the form of magnetic transitions within the medium. The discs themselves are rotatably mounted on a shaft or "spindle", the information being accessed by means of transducers located on a pivoting arm, which moves radially over the surface of the disc. The read/write heads or transducers must be accurately aligned with the storage tracks on the disc to ensure proper reading and writing of information; thus the discs must be rotationally stable.

Electric spindle motors are used to rotate the discs in disc drive systems. Such spindle motors may have either a fixed shaft and a rotating sleeve or a fixed sleeve and a rotating shaft. Depending on the type of spindle motor, a rotor hub is affixed to either the rotating shaft or to the rotating sleeve. The disc is then mounted on the rotor hub.

The spindle motor's shaft and sleeve must be rotatably mounted to each other so as to allow relative rotation between the shaft and sleeve, but so as to minimize lateral and axial motion as well as tilting motion. Fluid dynamic bearings are the preferred method of providing such mounting, although conventional ball bearings are sometimes used.

In fluid dynamic bearings, a thin film of a lubricating fluid—either gas or liquid—functions as the bearing surface between the sleeve and the shaft. Pressure generating grooves on either the sleeve or the shaft generate pressure gradients in the fluid that prevent the sleeve and the shaft from contacting each other during motor operation. The bearing properties such as stiffness and energy consumption as well as the cost of the bearing are dependant upon many factors such as the bearing dimensions and shape, the positioning of the grooves, and the size of the gaps between the sleeve and shaft.

The requirements for a specific spindle motor vary depending on the application in which the spindle motor will be used. Since hard disc drives are used for a large variety of applications, there is a need for a variety of types of spindle motors to meet the specific requirements of the various applications. Accordingly, there is a need to efficiently manufacture a variety of types of spindle motors, where each type of spindle motor is closely matched to the specific requirements of the applications for which it will be used.

The manufacture of fluid dynamic bearings is a labor intensive process that requires numerous steps including machining the components, etching the grooves, applying oil repellent film, assembling the components, and adding the lubricant. In the prior art, as shown in FIG. 1, the bearing and the spindle motor are manufactured together as a single unit and the bearing is an integral part of the spindle motor.

SUMMARY OF THE INVENTION

It is therefore an object of the present invention to provide a spindle motor and a method of manufacturing a spindle motor that improves manufacturing efficiency and that allows for easily matching design specifications with manufacturing requirements.

One aspect of the present invention is a bearing unit preferably a hydrodynamic bearing unit for use in a spindle motor where the bearing unit is a discrete component. Another aspect of the present invention is a spindle motor comprised of modular interchangeable units such as bearing units, rotor units, and stationary units, which can be combined to meet the specific needs of a particular application. A further aspect of the present invention is a method of manufacturing a spindle motor whereby the bearing unit is manufactured separately from the other components of the motor and is thereafter combined with the other motor components. A further aspect of the present invention is a method of manufacturing a motor wherein modular motor components are manufactured, requirements for a specific application are received, and a motor meeting those requirements is manufactured by selecting the appropriate components and combining them to make a motor that meets the received requirements.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION

Figure 1:
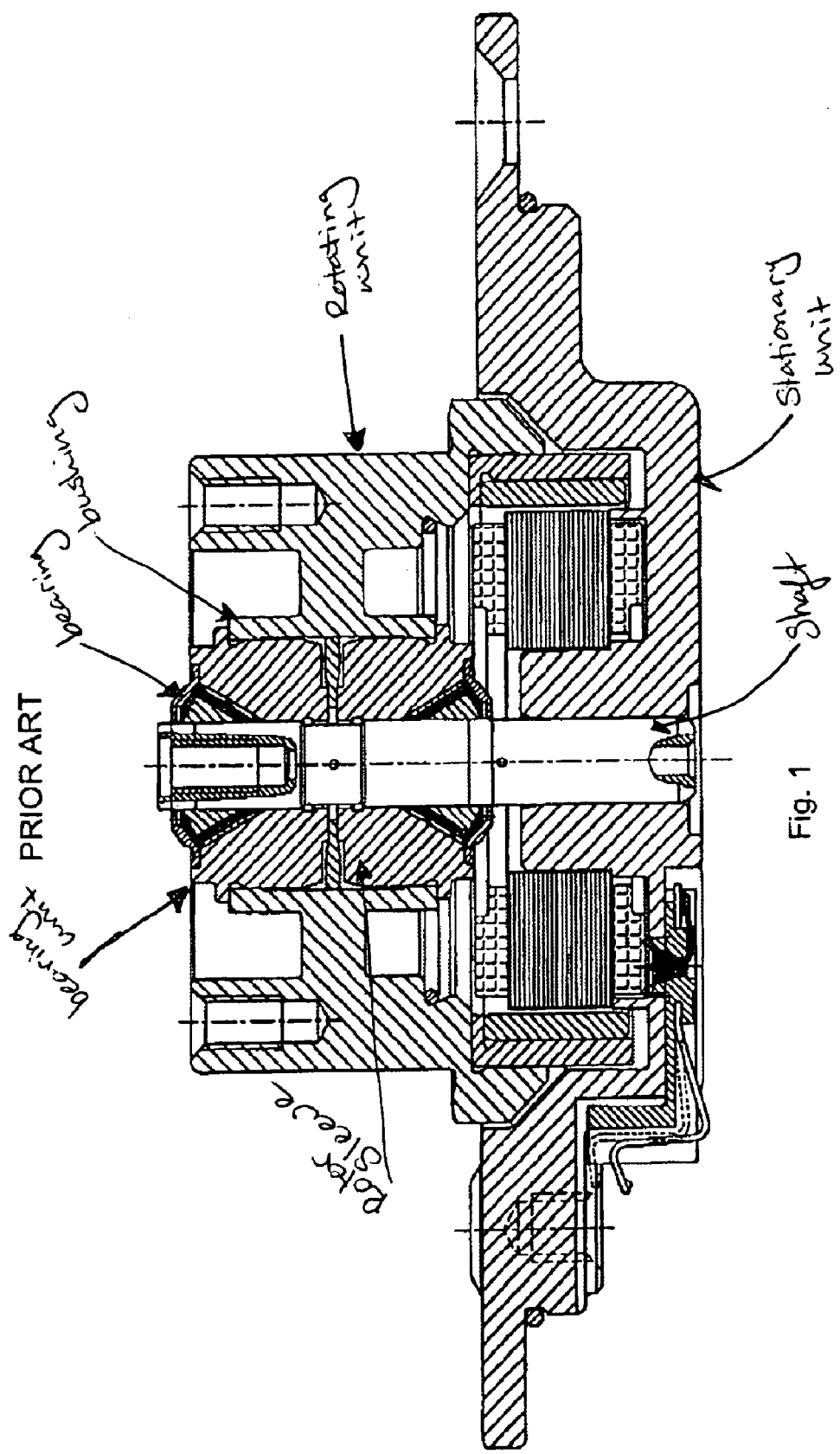
FIG. 1 is a cross sectional drawing showing a prior art spindle motor.
Figure 2:
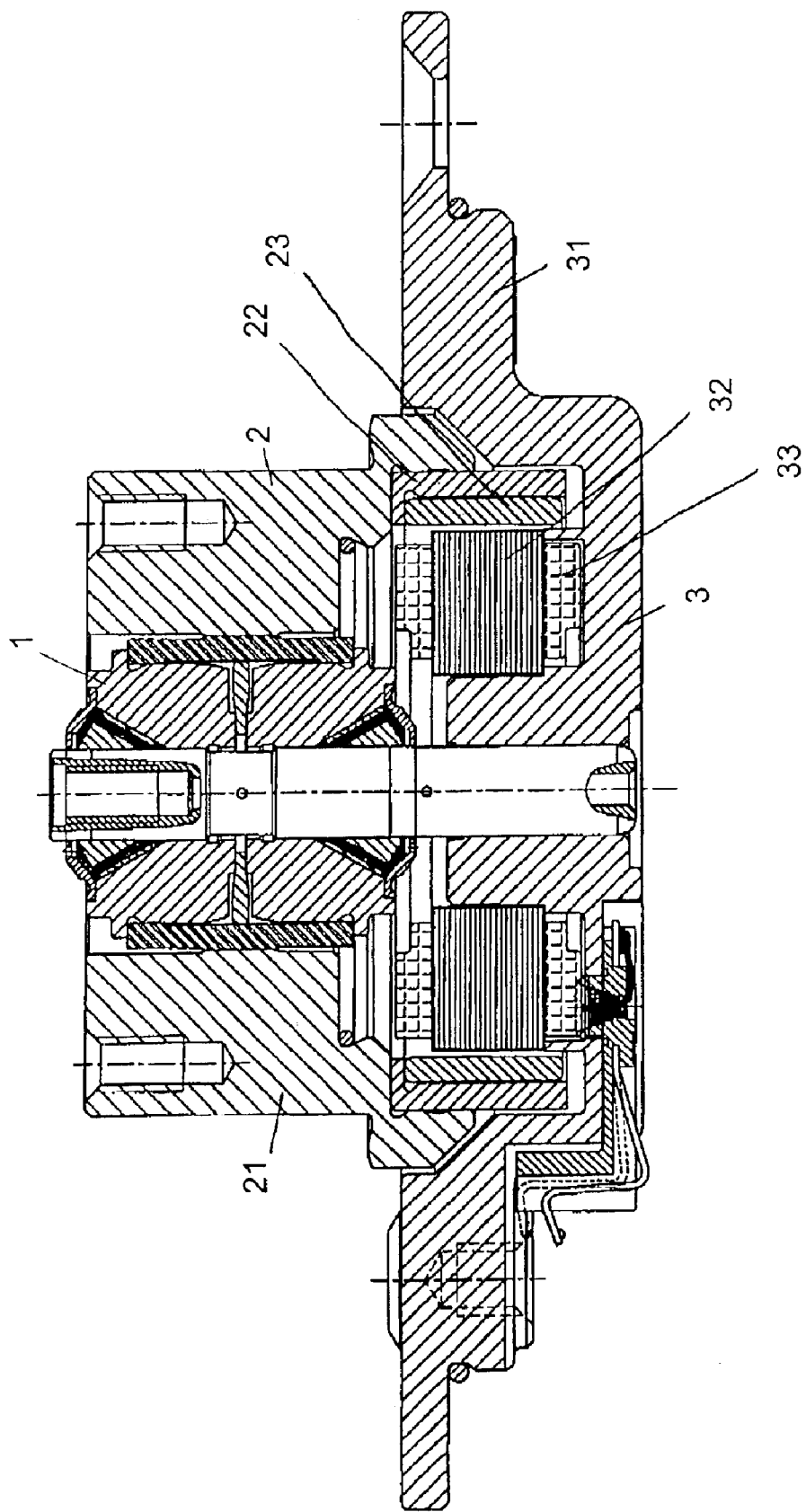
FIG. 2 is a cross sectional drawing showing a spindle motor embodying an aspect of the present invention.

A spindle motor embodying the present invention is shown in FIG. 2. The spindle motor is comprised of bearing unit 1, rotating unit 2, and stationary unit 3. Bearing unit 1 allows rotating unit 2 to rotate with respect to stationary unit 3.

As shown in FIG. 2, rotating unit 2 is comprised of rotor hub 21, yoke 22, and magnets 23. A disc (not shown) can be mounted on rotor hub 21. Yoke 22 mounts magnets 23 to rotor hub 21.

As shown in FIG. 2, stationary unit 3 is comprised of bracket 31, core 32, and coils 33. Bracket 31 allows the spindle motor to be attached to a hard disc drive. Core 32 and coils 33 are mounted to bracket 31 and they generate a rotating electric field.

Figure 3:
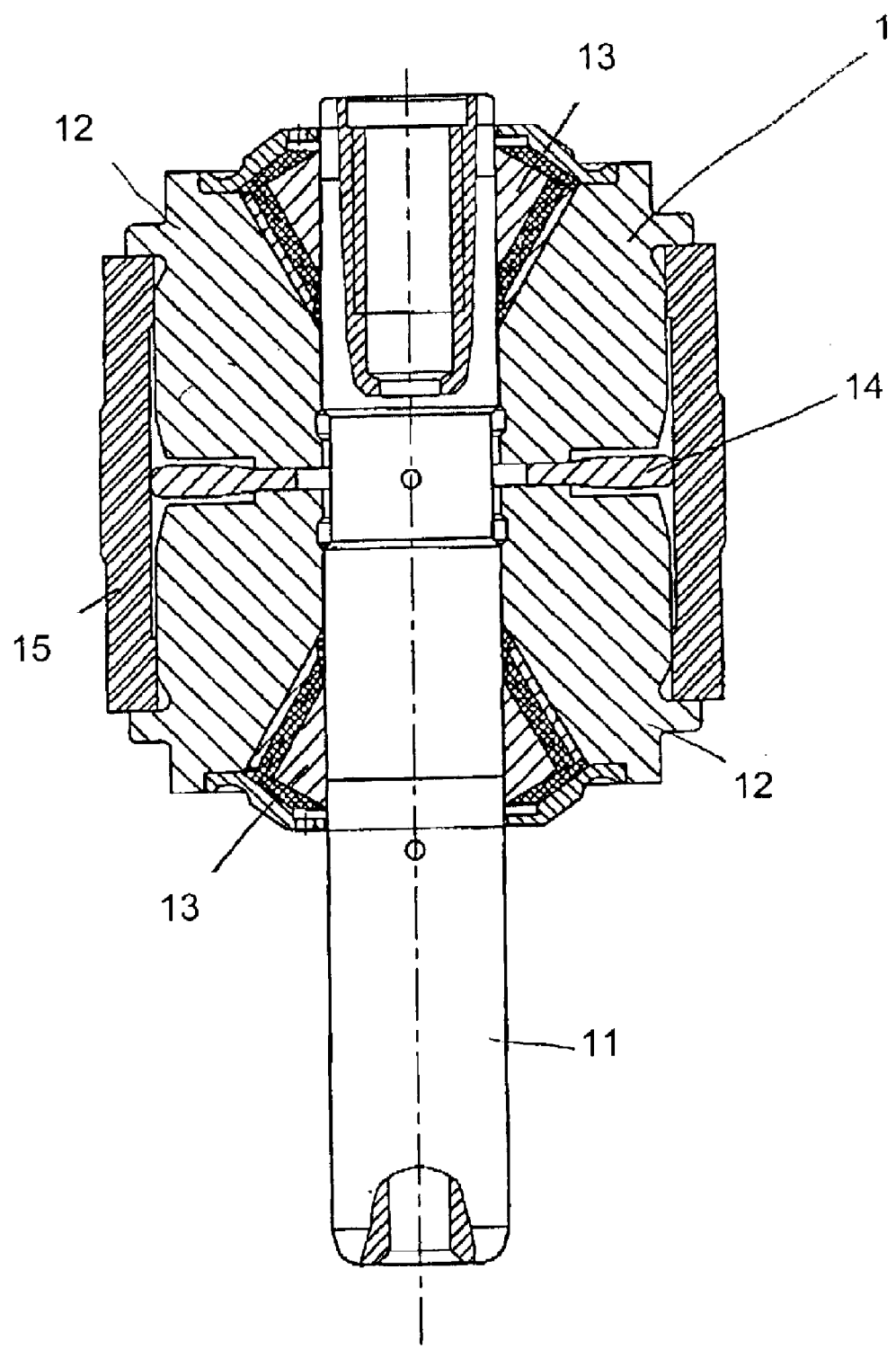
FIG. 3 is a cross sectional drawing showing a bearing unit embodying an aspect of the present invention.

As shown in FIG. 3, bearing unit 1 is comprised of fixed shaft 11, rotating sleeve 12, conical bearings 13, expansion joint 14, and bushing 15. Conical bearings 13 are hydrodynamic bearings that allow rotating sleeve 12 to rotate about fixed shaft 11 without contacting fixed shaft 11. Bushing 15 is affixed to rotating sleeve 12. Expansion joint 14 allows for thermal expansion in the bearing unit.

Fixed shaft 11 of bearing unit 1 is affixed to bracket 31 of stationary unit 3. Bushing 15 of bearing unit 1 is affixed to rotor hub 21 of rotating unit 2. During spindle motor operation, core 32 and coil 33 generate a rotating electric field that applies a rotational force to magnets 23 that is coupled to rotating sleeve 12 through yoke 22, rotor hub 21, and bushing 15. Accordingly, rotating sleeve 12 and rotating unit 2 rotate about fixed shaft 11.

A spindle motor according to the present invention can be manufactured with a rotating shaft and a stationary sleeve instead of a fixed shaft and a rotating sleeve. In which case, the rotating shaft would be affixed to the rotating unit and the stationary sleeve would be affixed to the stationary unit. Additionally, the bearings in the bearing unit need not be hydrodynamic conical bearings. Other types of bearings can be used such as hydrodynamic thrust bearings, hydrodynamic journal bearings, pivot bearings, or ball bearings.

In one aspect of the present invention, bearing unit 1 is manufactured separately from the other components of the spindle motor. It is then affixed to rotating unit 2 and to stationary unit 3 to form a spindle motor. Manufacturing bearing unit 1 as a separate component increases the ease with which the bearing can be handled and reduces the overall cost of manufacturing a spindle motor.

In another aspect of the present invention, a plurality of interchangeable types of bearing units are manufactured with a variety of bearing properties such as stiffness, energy consumption, durability, cost, operating temperature range, etc. Depending upon the particular application in which the spindle motor is to be used, the appropriate bearing unit is selected and then combined with a rotating unit and a stationary unit. Additionally, a plurality of interchangeable types of rotating units and a plurality of interchangeable types of stationary units can be manufactured, where each type of rotating unit and each type of stationary unit has distinct properties. Depending upon the performance requirements of a particular application in which a spindle motor is to be used, an appropriate type of bearing unit, an appropriate type of stationary unit, and an appropriate type of rotating unit is selected to manufacture a spindle motor that will meet the performance requirements while minimizing the cost of the motor.

The drawings and descriptions of the preferred embodiments are made by way of example rather than to limit the scope of the inventions, and they are intended to cove all such changes and modifications as are within the spirit and scope of the inventions.

What is claimed is:

1. A bearing unit for use in a spindle motor having a stationary unit and a rotating unit, said bearing unit comprising:

a shaft;

a sleeve;

a bearing; and a bushing encapsulating said sleeve of said bearing unit;

wherein said bearing unit is a discrete unitary component separated from one of said stationary unit and said rotational unit of said spindle motor by said encapsulating bushing positioned between said sleeve and one of said stationary unit and said rotational unit.

2. The bearing of claim 1 wherein:

said shaft is stationary; and said sleeve rotates.

3. The bearing of claim 2 wherein:

said bearing is a hydrodynamic conical bearing.

4. The bearing of claim 1 wherein said bushing is affixed to said sleeve.

5. The bearing of claim 1 wherein:

said sleeve is stationary; and said shaft rotates.

6. A spindle motor comprising:

a bearing unit;

a stationary unit; and a rotating unit;

wherein said bearing unit is a discrete unitary component encapsulated by a bushing to be separated from one of said stationary unit and said rotating unit;

wherein at least one constituent of said bearing unit is affixed to said stationary unit;

wherein at least one constituent of said bearing unit is affixed to said rotating unit.

7. The spindle motor of claim 6 wherein:

said bearing unit comprises:

a shaft;

a sleeve;

a bearing; and a said bushing affixed to said sleeve.

8. The spindle motor of claim 7 wherein:

said bushing is affixed to said rotating unit; and said shaft is affixed to said stationary unit.

* * * * *